United States Patent
Chow

(10) Patent No.: US 7,610,846 B2
(45) Date of Patent: Nov. 3, 2009

(54) CLAMP BAND FOR SPRING BRAKES

(75) Inventor: Lai Yee Chow, Hong Kong (HK)

(73) Assignee: Metro Bearing & Automotive Limited, N.T. (HK)

( * ) Notice: Subject to any disclaimer, the term of this patent is extended or adjusted under 35 U.S.C. 154(b) by 307 days.

(21) Appl. No.: 11/696,197

(22) Filed: Apr. 4, 2007

(65) Prior Publication Data
US 2008/0244879 A1 Oct. 9, 2008

(51) Int. Cl.
*F16J 3/02* (2006.01)
*B60T 17/00* (2006.01)

(52) U.S. Cl. .............................. 92/98 R; 92/128; 92/63
(58) Field of Classification Search .................. 92/63, 92/64, 98 R, 128; 403/338, 373
See application file for complete search history.

(56) References Cited

U.S. PATENT DOCUMENTS

| | | | |
|---|---|---|---|
| 3,796,138 A * | 3/1974 | Doyle et al. ................... | 92/63 |
| 5,193,432 A * | 3/1993 | Smith ............................ | 92/63 |
| 5,775,202 A * | 7/1998 | Plantan et al. ............... | 92/98 R |
| 6,988,442 B2 * | 1/2006 | Fisher ......................... | 92/98 R |
| 2007/0035177 A1 * | 2/2007 | Thompson et al. ............ | 92/63 |

* cited by examiner

*Primary Examiner*—Thomas E Lazo

(57) ABSTRACT

A clamp band for spring brakes which comprises an annular clamp band pre-formed with a side wall and a rim extended perpendicularly from a first end thereof, wherein during assembling of a spring brake when an edge of a first chamber, a diaphragm and an edge of a second chamber are positioned in sequential order on the rim a second end of the side wall is deformed to bend inwards to encompass the edge of the second chamber to secure the edges of the two chambers and the diaphragm in place. The annular clamp band comprises a first clamp band and a second clamp band having identical semi-annular shape.

5 Claims, 4 Drawing Sheets

CLAMP BAND FOR SPRING BRAKES

BACKGROUND OF THE INVENTION

The present invention relates to a clamp band for vehicle brakes and more particularly pertains to a clamp band for spring brakes which prevents the disengagement of the two chambers.

A conventional spring brake generally comprises a first chamber, a second chamber, a diaphragm, a spring and a pushrod connecting to a braking device such as a brake shoe or brake pad. The diaphragm is placed between the two chambers. The spring is heavily coiled between the diaphragm and the bottom of the first chamber. By controlling the amount of air pressure applied to the diaphragm and thereby controlling the compression of the spring, the driver can apply or release the brake. As a significant amount of energy is stored in the coiled spring, it is vital to hold the two chambers and the diaphragm in place to prevent the spring from bursting out of the first chamber.

Double diaphragm spring brakes are also available in the marketplace. A conventional double diaphragm spring brake generally comprises a service chamber and a parking chamber in tandem. The parking chamber comprises a first chamber, a second chamber, a diaphragm, a power spring and a pushrod similar to those as mentioned above. The service chamber also comprises a first chamber, a second chamber, a diaphragm, a return spring and a pushrod similar to those as mentioned above. The second chamber of the parking chamber and the first chamber of the service chamber shares a double cup shaped flange case which has a divider wall separating the second chamber of the parking chamber from the first chamber of the service chamber. The pushrod of the parking chamber connects to the diaphragm of the service chamber, and the pushrod of the service chamber connects from the diaphragm of the service chamber to a braking device such as a brake shoe or brake pad. The service brake system in the service chamber applies and releases the brakes when a driver uses the brake pedal during normal driving. The parking brake system in the parking chamber applies and releases the parking brakes when a driver uses the parking brake control. The emergency brake system uses parts of the service and parking brake systems to stop the vehicle in the event of a brake system failure. As a significant amount of energy is stored in the power spring, it is vital to hold the two chambers of the parking chamber and the diaphragm in place to prevent the power spring from bursting out of the parking chamber.

To this end, a conventional spring brake is typically equipped with a clamp band to engage the two chambers together with the diaphragm in between. However, if a user inadvertently loosens or disassembles the clamp band by loosening a screw thereon, or if the clamp band is loosened accidentally owing to, for example, a bump to the vehicle, or if the clamp band becomes out of order and fails to engage the chambers properly, the diaphragm is no longer securely fastened and thus can no longer keep the spring in place. As a result, the spring together with the diaphragm and the second chamber may burst away from the first chamber. In such a case, anybody in the surrounding area may be injured or even killed by the parts bursting away from the first chamber, let alone damage is likely to be caused to properties in the neighborhood.

With a view to preventing such incidents, some spring brakes have the housing of the first chamber and the clamp band being cast as one integral body. The second chamber is fastened to the first chamber by the method of spinning. The two chambers are then permanently joined together. Although such arrangement can prevent any accidental disengagement of the two chambers, it is susceptible of higher production costs and lower manufacturing efficiency. Moreover, if any component has any defect or if there is any error or abnormality during the assembling procedures, the air brake may fail to function properly and may not be repaired and will have to be disposed of, which results in a waste of resources.

BRIEF SUMMARY OF THE INVENTION

In view of the aforesaid disadvantages now present in the prior art, the present invention provides a clamp band for spring brakes which can securely engage the two chambers, thus preventing any accidental disengagement of the two chambers.

To attain this, the present invention generally comprises an annular clamp band pre-formed with a side wall and a rim extended perpendicularly from a first end thereof, wherein during assembling of a spring brake when an edge of a first chamber, a diaphragm and an edge of a second chamber are positioned in sequential order on the rim a second end of the side wall is deformed to bend inwards to encompass the edge of the second chamber to secure the edges of the two chambers and the diaphragm in place.

The annular clamp band comprises a first clamp band and a second clamp band having identical semi-annular shape, and each of the first clamp band and the second clamp band has a first end with a first connecting plate extended outward therefrom to connect to a first welding plate and a second end with a second connecting plate extended outward therefrom to connect to a second welding plate; the first clamp band and the second clamp band are connected to form the annular clamp band by joining the first welding plate of the first clamp band with the second welding plate of the second clamp band and the second welding plate of the first clamp band with the first welding plate of the second clamp band respectively.

The first welding plate of the first clamp band is joined with the second welding plate of the second clamp band by means of a first rivet passing through a rivet hole provided on each of the welding plates; the second welding plate of the first clamp band is joined with the first welding plate of the second clamp band by means of a second rivet passing through a rivet hole provided on each of the welding plates.

The side wall and the welding plates have uniform thickness; the difference between the outer radius of the side wall and the outer radius of each of the first welding plates is equal to the thickness of the side wall; the difference between the outer radius of each of the first welding plates and the outer radius of each of the second welding plates is equal to the thickness of each of the welding plates. Therefore, the first clamp band and the second clamp band are connected to each other in a manner which allows no extra space between connecting welding plates.

The welding plates and the connecting plates are substantially equal in their heights; the heights of both the welding plates and the connecting plates are less than the height of the side wall, so that each of the two ends of the side walls of the first and second clamp bands are slanted downwards towards a top end of the adjacent connecting plate to form a notch. The notches prevents sharp angles to be formed on the second end of the side wall during the deformation process to damage the second chamber.

In a preferred embodiment, the thickness of the side wall, the welding plates and the connecting plates are 3 mm; the rim has an inner radius of 90 mm; the outer radius of both the rim and the side wall is 103 mm; the first welding plate of the first clamp band and the second clamp band has an outer radius of 106 mm; the second welding plate of the first clamp band and the second clamp band has an outer radius of 109 mm; each of the welding plates has a height of 12 mm; the width of each of the notch is 10 mm; the side wall has a height of 22 mm before deformation, and after deformation the side wall has a height of 17 mm and the second end of the side wall bends inward at an angle of 20 degrees.

It is an object of the present invention to provide a clamp band formed by two semicircle clamp bands which requires less amount of raw materials for manufacturing the clamp band and thereby saving manufacturing costs.

It is an object of the present invention to provide a clamp band for spring brakes which can securely engage the two chambers to prevent the spring, the diaphragm and the second chamber from bursting out of the first chamber, causing damage to properties and/or injuries to anybody in the surrounding area.

It is a further object of the present invention to provide a clamp band for spring brakes which is of simple and reliable construction.

It is another further object of the present invention to provide a clamp band for spring brakes which is formed by two semicircle clamp bands and so requires less amount of raw materials for manufacturing the clamp band. The clamp band is therefore susceptible of a low cost of manufacture with regard to both materials and labor, and which accordingly is then susceptible of low prices of sale to the consuming public, thereby making such device economically available to the buying public.

An even further object of the present invention is to provide a clamp band for spring brakes which is readily applicable for existing conventional spring brakes.

DETAILED DESCRIPTION OF THE INVENTION

Figure 1:
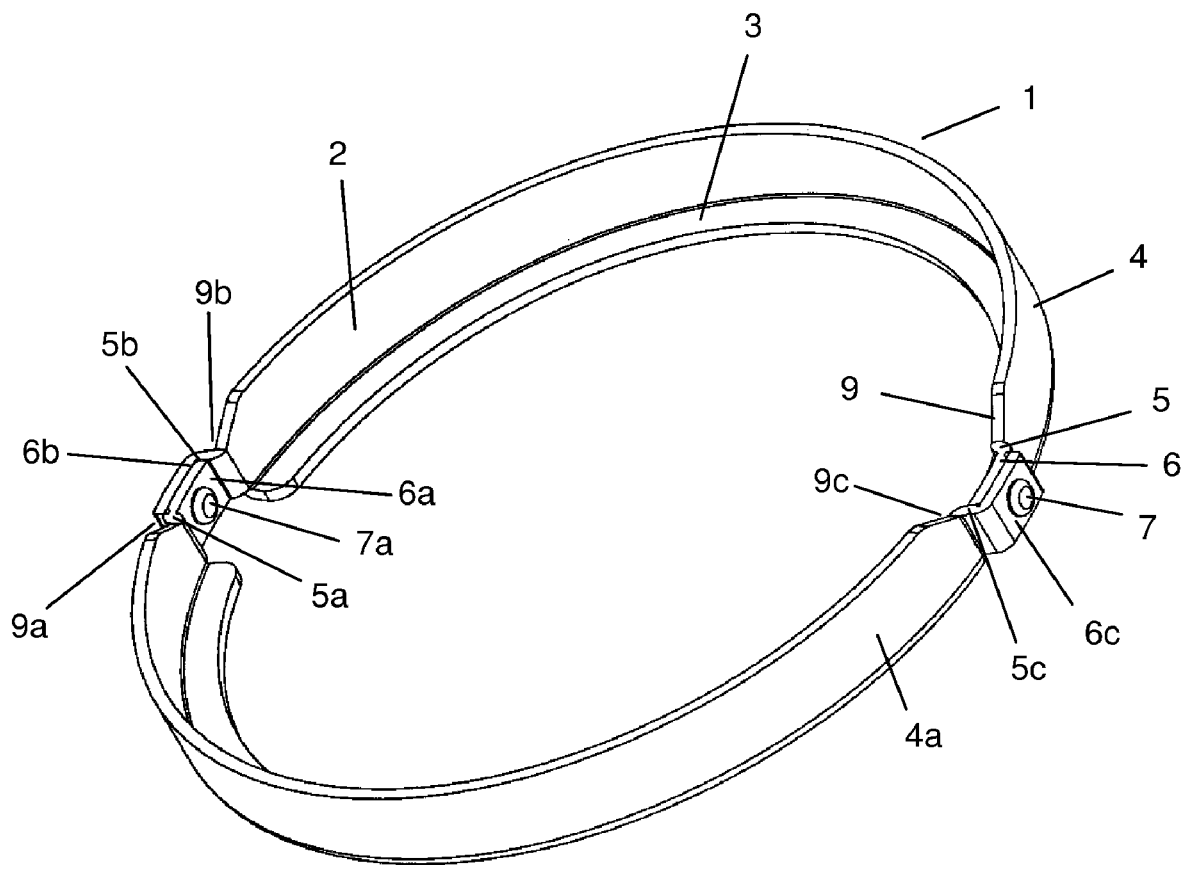
FIG. 1 shows the perspective view of a clamp band of the present invention before deformation formed by two semicircle clamp bands.
Figure 2:
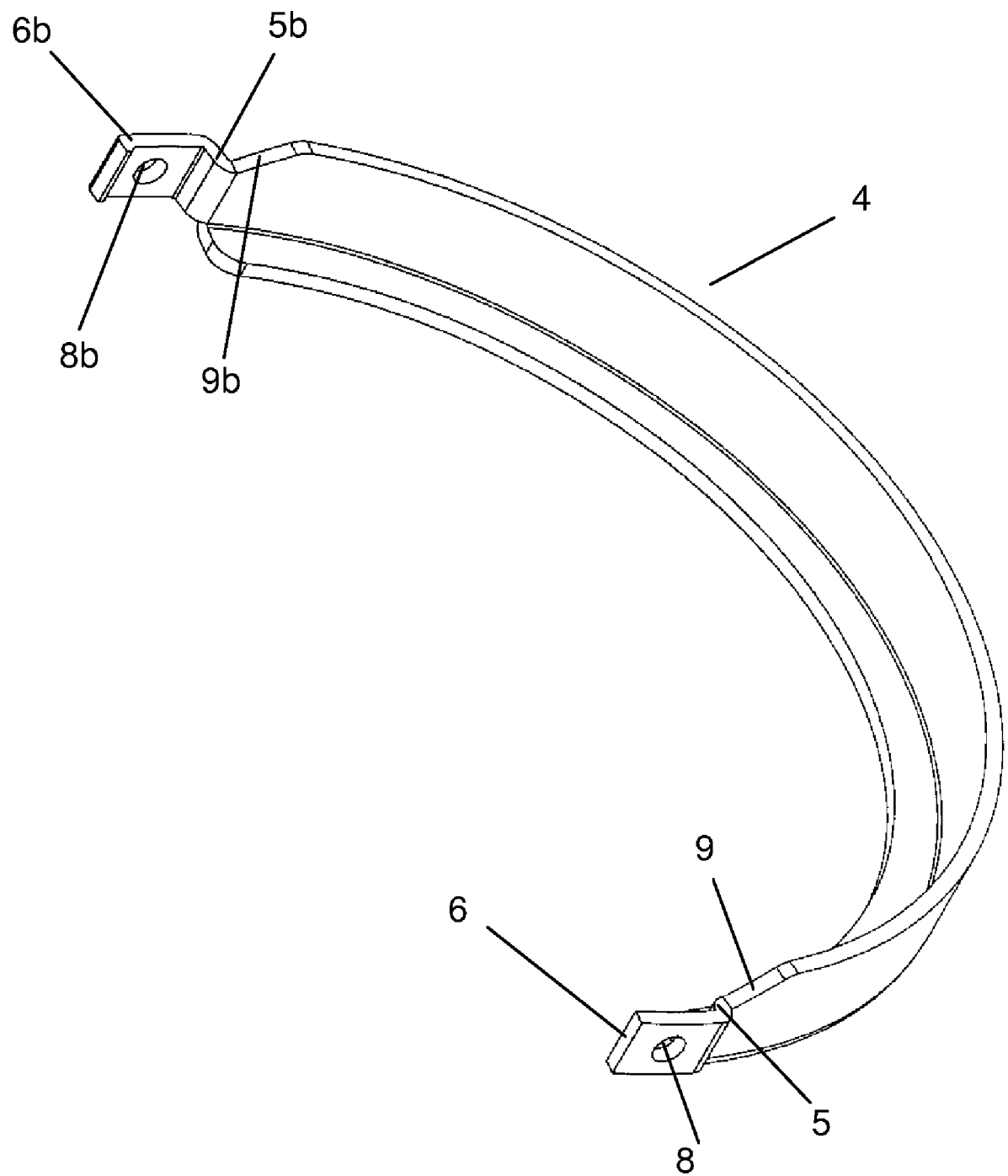
FIG. 2 shows the perspective view of a semicircle clamp band.
Figure 3:
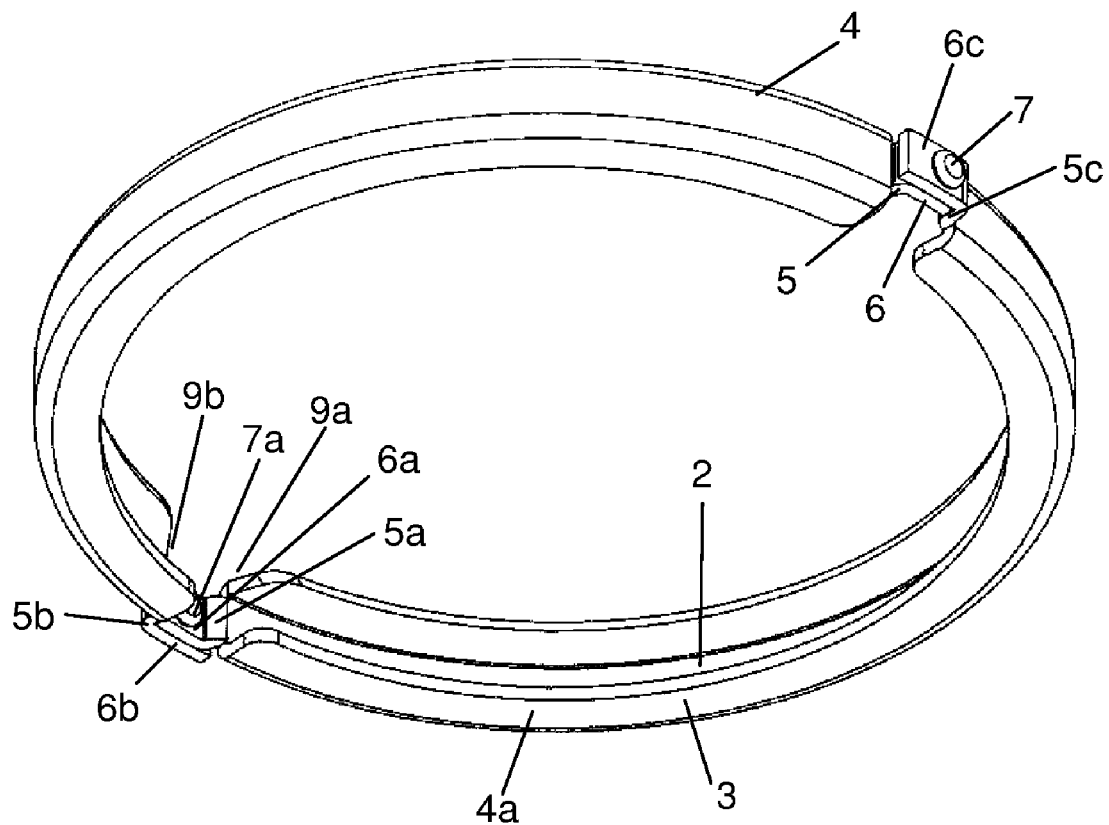
FIG. 3 shows the perspective view of the clamp band of the present invention after deformation.
Figure 4:
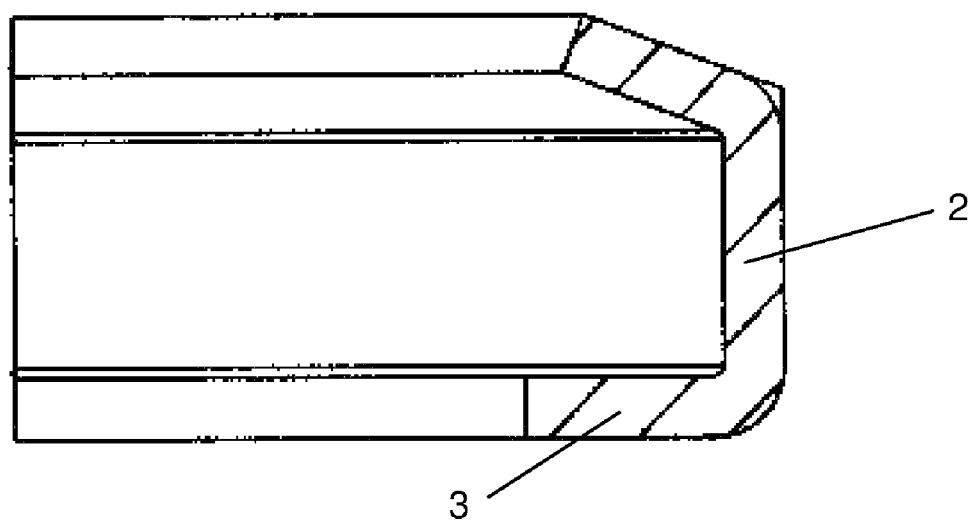
FIG. 4 shows the cross sectional view of the clamp band of the present invention after deformation.
Figure 5:
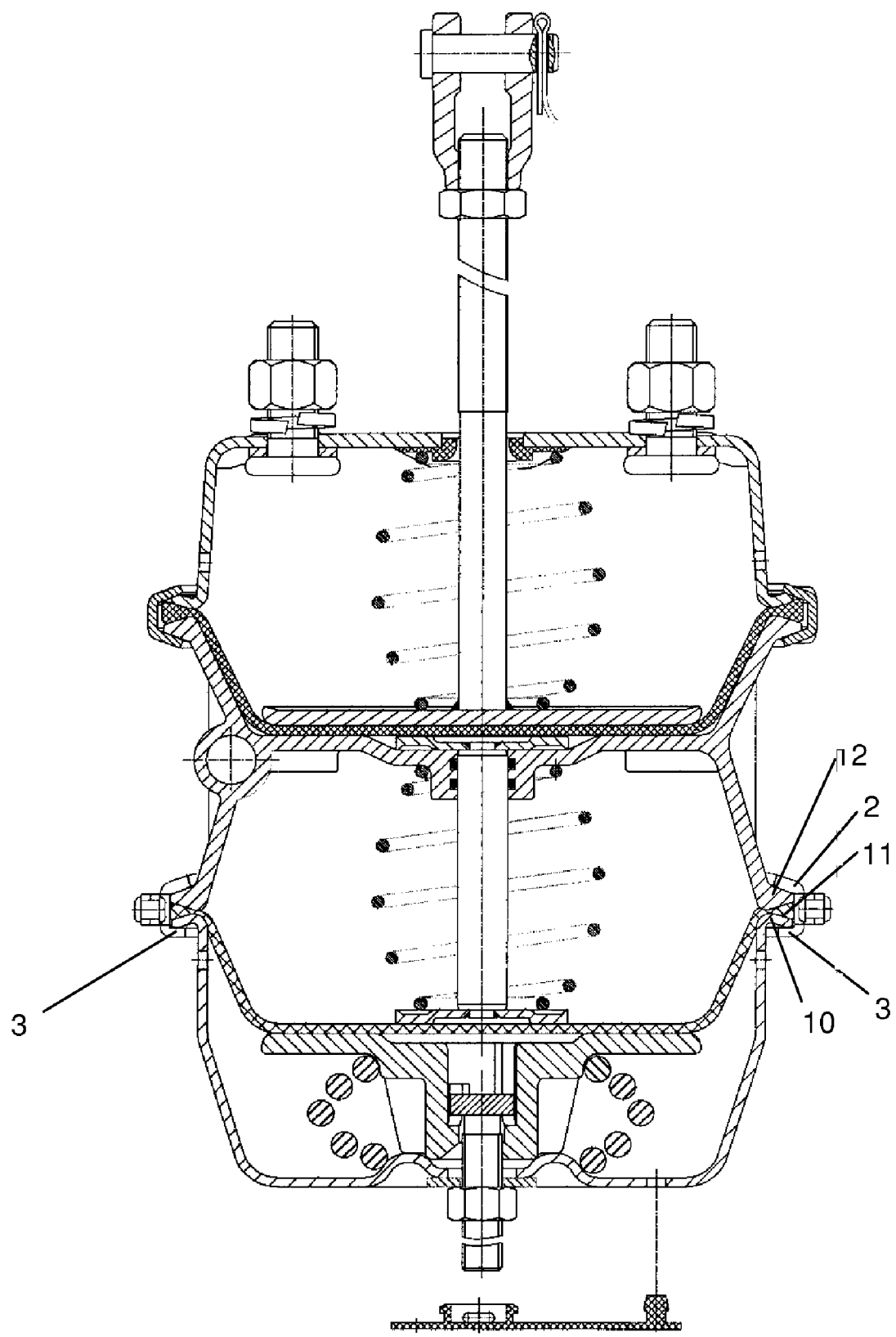
FIG. 5 shows the cross sectional view of a dual diaphragm spring brake incorporating the present invention.

As illustrated in FIG. 1 to FIG. 5, the present invention generally comprises an annular clamp band 1 pre-formed with a side wall 2 and a rim 3 extending perpendicularly from a first end thereof. The annular clamp band 1 comprises a first clamp band 4 and a second clamp band 4a having identical semi-annular shape, and each of the first clamp band 4 and the second clamp band 4a has a first end with a first connecting plate 5, 5a extended outward therefrom to connect to a first welding plate 6, 6a and a second end with a second connecting plate 5b, 5c extended outward therefrom to connect to a second welding plate 6b, 6c. The first clamp band 4 and the second clamp band 4a are connected to form the annular clamp band 1 by joining the first welding plate 6 of the first clamp band 4 with the second welding plate 6c of the second clamp band 4a and the second welding plate 6b of the first clamp band 4 with the first welding plate 6a of the second clamp band 4a respectively. The first welding plate 6 of the first clamp band 4 is joined with the second welding plate 6c of the second clamp band 4a by means of a first rivet 7 passing through a rivet hole 8 provided on each of the welding plates 6, 6c; the second welding plate 6b of the first clamp band 4 is joined with the first welding plate 6a of the second clamp band 4a by means of a second rivet 7a passing through rivet hole 8b provided on each of the welding plates 6a, 6b.

The side wall 2 and the welding plates 6, 6a, 6b, 6c have uniform thickness. In this embodiment, the thickness of the side wall 2, the welding plates 6, 6a, 6b, 6c and the connecting plates 5, 5a, 5b, 5c are 3 mm. The difference between the outer radius of the side wall 2 and the outer radius of each of the first welding plates 6, 6a is equal to the thickness of the side wall 2. The difference between the outer radius of each of the first welding plates 6, 6a and the outer radius of each of the second welding plates 6b, 6c is equal to the thickness of the welding plates 6, 6a, 6b, 6c. In this embodiment, the rim 3 has an inner radius of 90 mm. The outer radius of both the rim 3 and the side wall 2 is 103 mm. Each of the first welding plates 6, 6a of the first clamp band 4 and the second clamp band 4a has an outer radius of 106 mm. Each of the second welding plates 6b, 6c of the first clamp band 4 and the second clamp band 4a has an outer radius of 109 mm. Therefore, the first clamp band 4 and the second clamp band 4a are connected to each other in a manner which allows no extra space between connecting welding plates 6, 6a, 6b, 6c.

The welding plates 6, 6a, 6b, 6c and the connecting plates 7, 7a, 7b, 7c are substantially equal in their heights. In this embodiment, each of the welding plates 6, 6a, 6b, 6c has a height of 12 mm. The heights of both the welding plates 6, 6a, 6b, 6c and the connecting plates 7, 7a, 7b, 7c are less than the height of the side wall 2, so that each of the two ends of the side walls 2 of the first and second clamp bands 4, 4a are slanted downwards towards a top end of the adjacent connecting plate 7, 7a, 7b, 7c to form a notch 9, 9a, 9b, 9c. In this embodiment, the side wall 2 has a height of 22 mm before deformation, and the width of each of the notches 9, 9a, 9b, 9c is 10 mm. The notches 9, 9a, 9b, 9c prevent sharp angles to be formed on the second end of the side wall 2 during the deformation process to damage the second chamber.

During assembling of a spring brake when an edge of a first chamber 10, a diaphragm 11 and an edge of a second chamber 12 of the parking chamber are positioned in sequential order on the rim 3, a second end of the side wall 2 is deformed to bend inwards to encompass the edge of the second chamber 12 to secure the edges of the two chambers 10, 12 and the diaphragm 11 in place. In this embodiment, after deformation the side wall 2 has a height of 17 mm and the second end of the side wall 2 bends inward at an angle of 20 degrees.

As to a further discussion of the manner of usage and operation of the present invention, the same should be apparent from the above description. Accordingly, no further discussion relating to the manner of usage and operation is provided.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

The present invention is capable of other embodiments and of being practiced and carried out in various ways. It is to be understood that the phraseology and terminology employed herein are for the purpose of description and should not be regarded as limiting.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention.

What is claimed is:

1. A clamp band for spring brakes which comprises an annular clamp band pre-formed with a side wall and a rim extended perpendicularly from a first end thereof, wherein during assembling of a spring brake when an edge of a first chamber, a diaphragm and an edge of a second chamber are positioned in sequential order on the rim a second end of the side wall is deformed to bend inwards to encompass the edge of the second chamber to secure the edges of the two chambers and the diaphragm in place; the annular clamp band comprises a first clamp band and a second clamp band having identical semi-annular shape, and each of the first clamp band and the second clamp band has a first end with a first connecting plate extended outward therefrom to connect to a first welding plate and a second end with a second connecting plate extended outward therefrom to connect to a second welding plate; the first clamp band and the second clamp band are connected to form the annular clamp band by joining the first welding plate of the first clamp band with the second welding plate of the second clamp band and the second welding plate of the first clamp band with the first welding plate of the second clamp band respectively.

2. A clamp band for spring brakes as in claim 1, wherein the first welding plate of the first clamp band is joined with the second welding plate of the second clamp band by means of a first rivet passing through a rivet hole provided on each of the welding plates; the second welding plate of the first clamp band is joined with the first welding plate of the second clamp band by means of a second rivet passing through a rivet hole provided on each of the welding plates.

3. A clamp band for spring brakes as in claim 1, wherein the side wall and the welding plates have uniform thickness; the difference between the outer radius of the side wall and the outer radius of the first welding plate is equal to the thickness of the side wall; the difference between the outer radius of each of the first welding plates and the outer radius of each of the second welding plates is equal to the thickness of each of the welding plates.

4. A clamp band for spring brakes as in claim 1, wherein the welding plates and the connecting plates are substantially equal in their heights; the heights of both the welding plates and the connecting plates are less than the height of the side wall, so that each of the two ends of the side walls of the first and second clamp bends are slanted downwards towards a top end of the adjacent connecting plate to form a notch.

5. A clamp band for spring brakes as in claim 1, wherein the thickness of the side wall, the welding plates and the connecting plates are 3 mm; the rim has an inner radius of 90 mm; the outer radius of both the rim and the side wall is 103 mm; the first welding plate of the first clamp band and the second clamp band has an outer radius of 106 mm; the second welding plate of the first clamp band and the second clamp band has an outer radius of 109 mm; each of the welding plates has a height of 12 mm; the width of each of the notch is 10 mm; the side wall has a height of 22 mm before deformation, and after deformation the side wall has a height of 17 mm and the second end of the side wall bends inward at an angle of 20 degrees.

\* \* \* \* \*